United States Patent [19]

Stillwell

[11] Patent Number: 4,787,214
[45] Date of Patent: Nov. 29, 1988

[54] TRANSPORT REFRIGERATION SYSTEM
[75] Inventor: Jack K. Stillwell, Nokomis, Fla.
[73] Assignee: Thermo King Corporation, Minneapolis, Minn.
[21] Appl. No.: 124,323
[22] Filed: Nov. 23, 1987
[51] Int. Cl.⁴ .............................................. F25D 17/00
[52] U.S. Cl. ..................................... 62/228.4; 62/180; 62/267; 62/323.4
[58] Field of Search ..................... 62/323.4, 323.1, 133, 62/228.4, 228.2, 267, 180

[56] References Cited
U.S. PATENT DOCUMENTS

| 773,426 | 10/1904 | Rosenquist. | |
|---|---|---|---|
| 2,130,995 | 9/1938 | Henney | 62/228.4 X |
| 2,157,758 | 5/1939 | Jacobsen. | |
| 2,213,327 | 9/1940 | Roehri. | |
| 2,258,970 | 10/1941 | Busttell. | |
| 2,546,856 | 3/1951 | Frazier. | |
| 2,687,650 | 8/1954 | Renaud. | |
| 2,720,087 | 10/1955 | Groene | 62/323.4 X |
| 2,910,839 | 11/1959 | Adams | 62/267 X |
| 3,220,211 | 11/1965 | Nordquest. | |
| 3,380,315 | 4/1968 | Emerson. | |
| 3,771,318 | 11/1973 | Roberts | 62/228.4 X |
| 4,484,901 | 11/1984 | Toti et al. | |

Primary Examiner—Harry B. Tanner
Attorney, Agent, or Firm—D. R. Lackey

[57] ABSTRACT

A transport refrigeration system including a compressor, an evaporator, a condenser, an air mover assembly for the evaporator and condenser comprising fans and-/or blowers, and a prime mover for the compressor having first and second selectable speeds. The speed of the air mover assembly is mechanically interlocked with the speed of the prime mover via a pulley driven speed changer, to eliminate the possibility of overspeeding of the air mover assembly. The speed changer changes the speed of the prime mover by a mechanical movement which cannot be made without tension in the pulley belts automatically changing the pulley ratio of the speed changer, to maintain a substantially constant speed for the air mover assembly, notwithstanding a change in prime mover speed.

5 Claims, 2 Drawing Sheets

TRANSPORT REFRIGERATION SYSTEM

BACKGROUND OF THE INVENTION

1. Field of the Invention

The invention relates to transport refrigeration systems, such as the refrigeration systems used for conditioning perishable and frozen loads carried by trucks, trailers and containers.

2. Description of the Prior Art

Transport refrigeration systems commonly employ an internal combustion engine as the prime mover for the refrigeration compressor. It is also common to operate the engine in one of two selectable speeds according to the requirements of the load being conditioned. For example, when the temperature of the served space is being initially pulled down towards set point, the refrigeration system would operate in a high speed cooling mode until the temperature of the served space reaches a predetermined temperature relative to set point. The engine would then be switched to low speed cool until the set point is reached. Below set point, the system would operate in a low speed heating mode, and it may operated in a high speed heating mode if the temperature drops below a predetermined value relative to set point. U.S. Pat. Nos. 4,325,224 and 4,419,866, which are assigned to the same assignee as the present application, set forth transport refrigeration systems which utilize different heating and cooling modes, including the high and low speed modes described for both heating and cooling.

Transport refrigeration systems additionally commonly employ an electrical solenoid for operating the throttle of the internal combustion engine when the system requires a change from one compressor speed to the other. In some systems the prime mover also provides the motive force for driving evaporator and condenser fans and/or blowers, hereinafter called "air mover means", via a suitable drive arrangement which has a selectable drive ratio such that the air mover means may be driven at substantially the same speed at both speeds of the prime mover. These systems automatically change the drive ratio when the speed relay picks up, and when the speed relay drops out. If the throttle solenoid should fail, either mechanically or electrically in the high speed mode, the change in drive ratio would still occur and overspeeding of the air mover means would result.

It would be desirable to be able to drive the air mover means from the prime mover without the possiblilty of a failure which could cause overspeeding of the air mover means.

SUMMARY OF THE INVENTION

The present invention eliminates the possibility of fan or blower overspeed by driving the air mover means of a transport refrigeration system from the prime mover via a speed changer having driven and driving pulleys and a changeable pulley ratio. The speed changer is constructed to mechanically interlock the prime mover and air mover means, ie., a predetermined mechanical movement required to change the speed of the prime mover cannot be made without simultaneously chaning the pulley ratio.

In a preferred embodiment of the invention the speed changer is of the type which requires that it be moved physically in order to change the pulley ratio, such as by an electrical or hydraulic actuator. This physical movement of the speed changer is mechanically coupled to the throttle of the prime mover, to change the speed of the prime mover. Thus, if physical movement of the speed changer actually takes place it is known that the prime mover speed has been changed and that the pulley ratio has also been changed accordingly, to maintain the driven speed of the air mover means substantially constant. The invention eliminates the conventional throttle solenoid.

BRIEF DESCRIPTION OF THE DRAWINGS

The invention may be better understood and further advantages and uses thereof more readily apparent when considered in view of the following detailed description of exemplary embodiments, taken with the accompanying drawings, in which.

DESCRIPTION OF PREFERRED EMBODIMENTS

Figure 1:
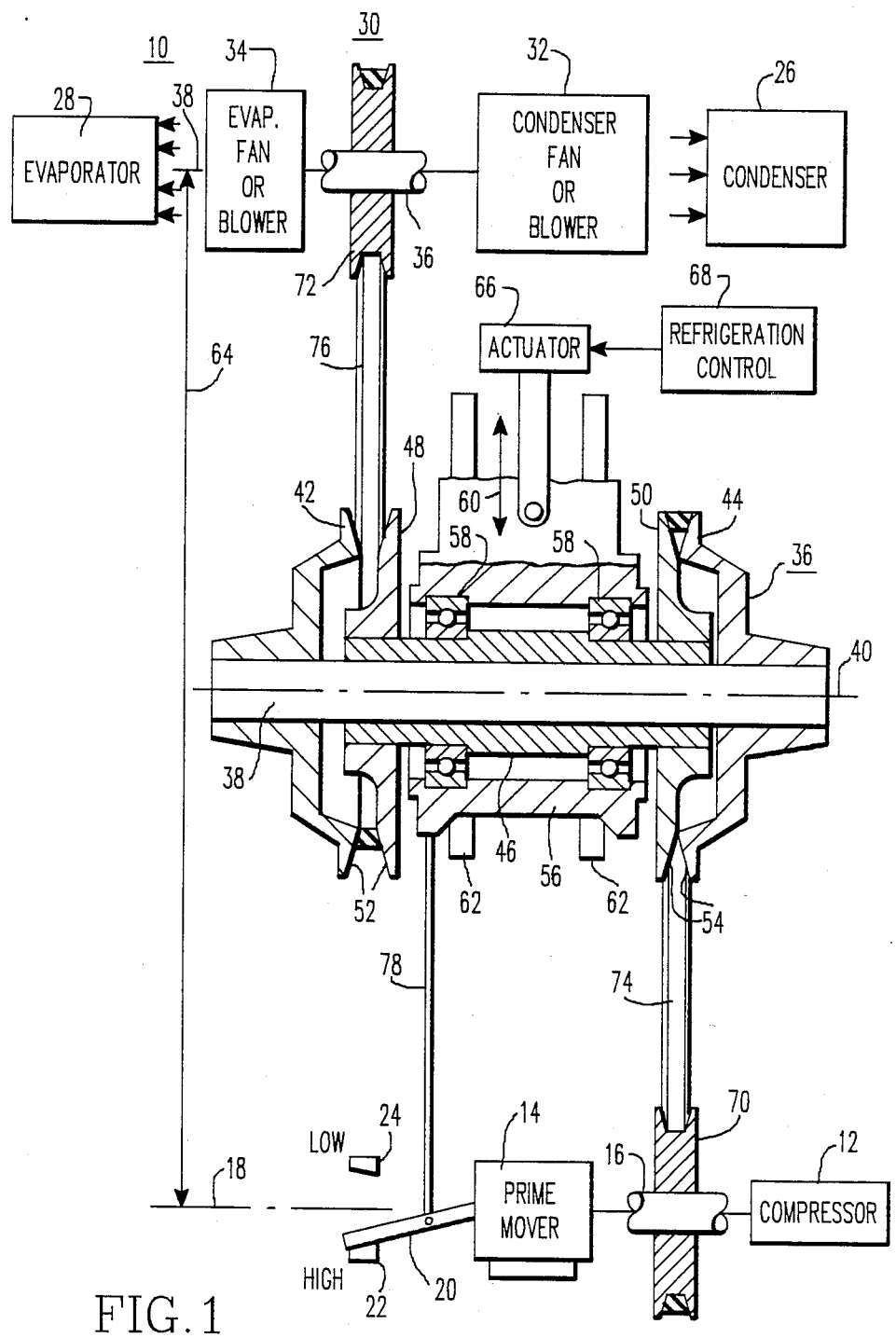
FIG. 1 illustrates a transport refrigeration system constructed according to the teachings of the invention, including a speed changer in a first physical position which simultaneously selects a predetermined first pulley ratio and the higher of two selectable prime mover speeds.
Figure 2:
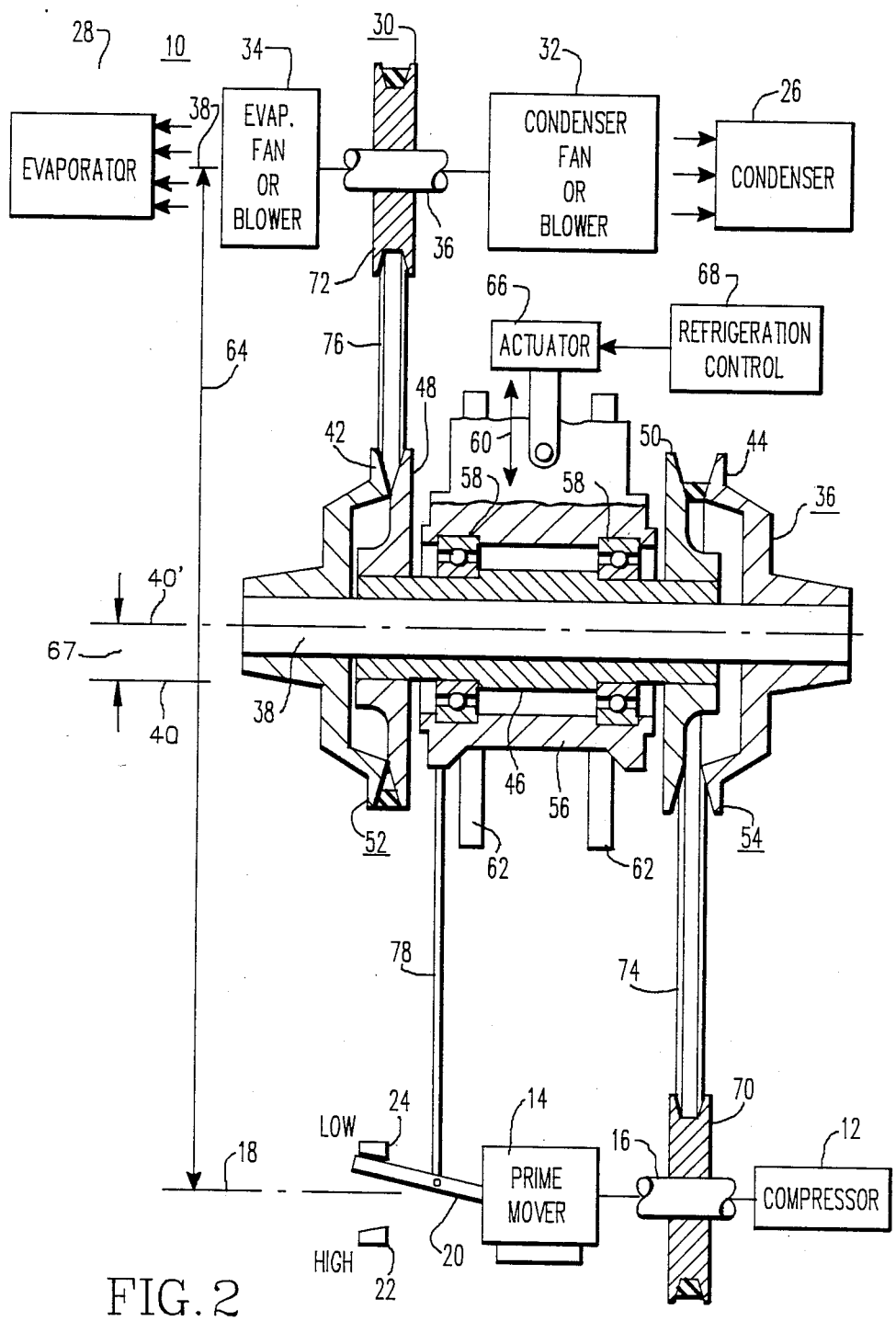
FIG. 2 is a transport refrigeration system similar to the system of FIG. 1, except with the speed changer in a second physical position which selects a second predetermined pulley ratio and the lower of the two selectable prime mover speeds.

Referring now to the drawings, FIGS. 1 and 2 illustrate a transport refrigeration system 10 constructed according to the teachings of the invention. FIGS. 1 and 2 are similar, except FIG. 1 illustrates system 10 in a high speed mode and FIG. 2 illustrates system 10 in a low speed mode. Only sufficient details of a transport refrigeration system are shown in the Figures to enable the invention to be understood. For a more complete description of a transport refrigeration system the hereinbefore mentioned United States patents may be referred to.

Transport refrigeration system 10 includes a refrigerant compressor 12 driven by a prime mover 14. Prime mover 14 is an internal combustion engine, such as a Diesel engine, which includes an output shaft 16 having a longitudinal axis 18, and a throttle linkage 20. Throttle linkage 20 has high and low speed positions 22 and 24, respectively, for selecting two predetermined engine speeds, such as 2200 RPM and 1400 RPM, respectively.

Transport refrigeration system 10 further includes a condenser 26, an evaporator 28, and air mover means 30. Air mover means 30 includes a fan or blower assembly 32 for condenser 26, a fan or blower assembly 34 for evaporator 28, and a shaft 36 having a longitudinal axis 38. Shaft 36 is common to both fan or blower assemblies 32 and 34.

The prime mover 14 and air mover means 30 are mechanically interlocked via a speed changer or variator 36 which is mounted between them. Speed changer 36, which is shown partially in section, has a changeable pulley ratio, and includes a shaft 38 having a longitudinal axis 40. Pulley faces 42 and 44 are fixed to opposite ends of shaft 38.

Shaft 38 is disposed within a hollow shaft 46, with shaft 38 being axially slidable within hollow shaft 46, along axis 40. Pulley faces 48 and 50 are fixed to opposite ends of hollow shaft 46, with pulley faces 42 and 48 cooperatively defining a first pulley 52, and with pulley faces 44 and 50 cooperatively defining a second pulley 54.

The outside of hollow shaft 46 is journeled for rotation within a support structure 56 via suitable bearings 58, and the support structure 56 is mounted between the prime mover 14 and the air mover means 30 with the longitudinal axes 18, 38 and 40 of shafts 16, 36 and 38, respectively, in spaced parallel relation.

Support structure 56 is mounted for guided movement back and forth between the prime mover 14 and air mover means 30, in a direction perpendicular to longitudinal axes 18, 38 and 40, as indicated by double headed arrow 60. The mounting means for support structure 56, indicated generally at 62, may be any suitable support rails or rods which permit slidable movement of the support structure 56 in the directions of double headed arrow 60, while preventing movement in the direction of axis 40. Thus, while the dimension between axes 18 and 38 of shafts 16 and 36, respectively, indicated by double headed arrow 64 is fixed, the dimensions between the longitudinal axes 40 and 18, and between 40 and 38, are changeable.

Support structure 56 is moved between first and second predetermined positions in its guided path by an actuator 66, which obtains its signals from refrigeration control 68. As stated in the hereinbefore mentioned U.S. Pat. Nos. 4,325,224 and 4,419,866 a speed relay 2K picks up when the high compressor speed is required, and it drops out when the low compressor speed is required. The 2K relay has contacts arranged to control actuator 66 such that when the 2K relay is picked up, calling for high speed, the actuator 66 extends to move speed changer 36 towards the prime mover 14, which is the position shown in FIG. 1. In like manner, when the 2K relay drops out, the actuator 66 moves speed changer towards air mover means 30, which is the position shown in FIG. 2.

To illustrate the rectilinear movement of speed changer 36, the longitudinal axis 40 of shaft 38 is given a prime mark in FIG. 2. The spacing 67 between axes 40 and 40' shown in FIG. 2 indicates the amount of movement of speed changer 36 as it changes positions under influence of actuator 66.

Actuator 66 may be an electrical solenoid, similar to the throttle solenoid which is eliminated by the present invention, or it may be hydraulic. If hydraulic, it may be arranged to be operated by engine oil pressure, as taught by U.S. Pat. No. 4,329,957, which patent is assigned to the same assignee as the present application. U.S. Pat. Nos. 4,325,224; 4,329,957, and 4,419,866 are hereby incorporated into the present application by reference.

To complete the interlocking arrangement, pulleys 70 and 72 are fixed to shafts 16 and 36, respectively, a V-belt 74 is disposed to link pulleys 54 and 70, a V-belt 76 is disposed to link pulleys 52 and 72, and a mechanical linkage 78 is disposed between throttle linkage 20 and the support structure 56 of the speed changer 36. Thus, pulley 54 of speed changer 36 is driven by the prime mover, and pulley 52 of speed changer 36 drives air mover means 30.

The V-belts 74 and 76 are relatively unstretchable. Thus, when actuator 66 moves speed changer 36 towards prime mover 14 and away from air mover means 30, the tension in belt 76 forces pulley faces 42 and 48 apart to cause belt 76 to move towards axis 40 and reduce the effective diameter of the pulley pitch circle. Simultaneously, pulley faces 44 and 50 are moving closer together, taking up any slack in belt 74 by forcing belt 74 away from axis 40 to increase the effective diameter of the pulley pitch circle. The movement of speed changer 36 towards prime mover 14 also simultaneously moves throttle linkage 20 to the high speed position. Thus, while the pulley ratio is changing in a direction which would reduce the speed of the air mover assembly 30, the throttle linkage 20 is being changed in a direction which increases the speed of the prime mover 14, with the result being a substantially constant speed for pulley 72 and air mover assembly 30. The actuator cannot move the speed changer 36 without the pulley ratio of the speed changer changing, and the same movement which causes the pulley ratio to change simultaneously changes the speed of the prime mover 14 and compressor 12.

In like manner when actuator 66 moves speed changer 36 away from prime mover 14 and towards air mover means 30, the tension in belt 74 forces pulley faces 44 and 50 apart to cause belt 74 to move towards axis 40 and reduce the effective diameter of the pulley pitch circle. Simultaneously, pulley faces 42 and 48 are moving closer together, taking up any slack in belt 76 by forcing belt 74 away from axis 40 to increase the effective diameter of the pulley pitch circle. The movement of speed changer 36 away from prime mover 14 also simultaneously moves throttle linkage 20 to the low speed position. Thus, while the pulley ratio is changing in a direction which would increase the speed of the air mover assembly 30, the throttle linkage 20 is being changed in a direction which reduces the speed of the prime mover 14, with the result again being a substantially constant speed for pulley 72 and air mover assembly 30.

In summary, the mechanical interlocking of the prime mover 14 and air mover means 30 via the speed changer 36 according to the teachings of the invention prevents failures which could cause overspeeding of the air mover assembly 30. Any likely failure mode will always find the speed of the prime mover 14 and the speed of the air mover means 30 properly coordinated. Further, the mechanical interlocking is provided by a relatively low cost, rugged and reliable speed changer arrangement in which a simple rectilinear movement of the speed changer 36 forces simultaneous changes in both pulley ratio and prime mover speed.

I claim as my invention:

1. A transport refrigeration system comprising:
   a compressor,
   a prime mover for said compressor having selectable speeds via a predetermined mechanical movement,
   an evaporator,
   a condenser,
   air mover means for said evaporator and condenser,
   speed changer means,
   pulleys on the prime mover, speed changer means, and air mover means,
   first and second belts linking pulleys of the prime mover and speed changer means, and pulleys of the speed changer means and the air mover means, respectively,
   and a mechanical link between the speed changer means and prime mover,
   said speed changer means having a changeable pulley ratio, with said prime mover driving said air mover means via said speed changer means, said speed changer means mechanically interlocking said prime mover and said air mover means such that physical movement of the speed changer means relative to the prime mover simultaneously initiates the predetermined mechanical movement which selects a prime mover speed via the mechanical link, and tensions the first and second belts to effect a change in the pulley ratio of the speed changer means, whereby the speed of the prime mover cannot be changed without automatically changing the pulley ratio of the speed changer means, and the pulley ratio cannot be changed without automatically changing the speed of the prime mover.

2. The transport refrigeration system of claim 1 wherein the speed changer means includes first and second pulleys each having a pair of pulley faces, with at least one pulley face of each pair being axially movable, and means mechanically linking an axially movable pulley face of each of the first and second pulleys such that increasing the spacing between the pulley faces of one of the first and second pulleys simultaneously reduces the spacing between the pulley faces of the other of the first and second pulleys.

3. A transport refrigeration system comprising:
   a compressor,
   a prime mover for said compressor,
   said prime mover including a first shaft and a pulley,
   speed selector means for said prime mover,
   an air mover assembly including a second shaft and a pulley,
   speed changer means including a third shaft having driving and driven pulleys,
   said speed changer means being disposed between said prime mover and said air mover means, with longitudinal axes of said first, second and third shafts being in spaced parallel relation,
   first and second belts,
   said first belt linking the driving pulley and the pulley on the first shaft of said prime mover,
   said second belt linking the driven pulley and the pulley on the second shaft of said air mover assembly,
   said driving and driven pulleys each having a pair of pulley faces, with at least one of each pair being axially movable,
   means mechanically linking predetermined pulley faces of the driving and driven pulleys such that increasing the spacing between the pulley faces of one pulley decreases the spacing between the pulley faces of the other pulley,
   actuator means for moving the speed changer means towards and away from the prime mover,
   and means mechanically linking the speed changer means with the speed selector means of the prime mover such that when the actuator means moves the speed changer means the speed of the prime mover and first shaft changes,
   wherein tension in said first and second belts automatically moves the mechanically linked pulley faces to maintain the speed of the second shaft substantially constant notwithstanding a change in the speed of the first shaft.

4. The transport refrigeration system of claim 3 wherein the speed selector means is selectively operable to select one of two predetermined speeds for the first shaft, and the actuator means moves the speed changer means between first and second positions, wherein the first position selects a first speed for the first shaft and the second position selects a second speed for the first shaft.

5. In a transport refrigeration system having a compressor, a prime mover for said compressor having selectable speeds, an evaporator, a condenser, and air mover means for said evaporator and condenser, the improvement comprising:
   a speed changer having a changeable pulley ratio,
   means mounting said speed changer for mechanical movement relative to said prime mover and said air mover means,
   means for physically moving said speed changer when a different compressor speed is desired,
   and means mechanically linking the speed changer, the prime mover and the air mover means such that the prime mover drives the air mover means via the speed changer, and such that a first movement of the speed changer simultaneously selects a first speed of the prime mover and a pulley ratio of the speed changer which provides a predetermined speed for the air mover means, and a second movement of the speed changer simultaneously selects a second speed of the prime mover and a pulley ratio which provides the same predetermined speed for the air mover means.

* * * * *